United States Patent
Dugas et al.

(10) Patent No.: US 11,921,602 B2
(45) Date of Patent: Mar. 5, 2024

(54) EDGE-BASED DATA COLLECTION SYSTEM FOR AN OBSERVABILITY PIPELINE SYSTEM

(71) Applicant: Cribl, Inc., San Francisco, CA (US)

(72) Inventors: Paul Avery Dugas, Canton, GA (US); Dritan Bitincka, Edgewater, NJ (US); Ledion Bitincka, San Francisco, CA (US)

(73) Assignee: Cribl, Inc., San Francisco, CA (US)

( * ) Notice: Subject to any disclaimer, the term of this patent is extended or adjusted under 35 U.S.C. 154(b) by 0 days.

(21) Appl. No.: 18/167,434

(22) Filed: Feb. 10, 2023

(65) Prior Publication Data
US 2023/0259438 A1    Aug. 17, 2023

Related U.S. Application Data

(60) Provisional application No. 63/310,901, filed on Feb. 16, 2022, provisional application No. 63/309,905, filed on Feb. 14, 2022.

(51) Int. Cl.
| | |
|---|---|
| G06F 15/16 | (2006.01) |
| G06F 11/30 | (2006.01) |
| G06F 11/34 | (2006.01) |

(52) U.S. Cl.
CPC ...... *G06F 11/3072* (2013.01); *G06F 11/3409* (2013.01)

(58) Field of Classification Search
CPC .......................... G06F 11/3072; G06F 11/3409
USPC ....................................................... 709/224
See application file for complete search history.

(56) References Cited

U.S. PATENT DOCUMENTS

| | | | |
|---|---|---|---|
| 7,587,725 B2 * | 9/2009 | Morrison | G06F 9/54 719/330 |
| 8,086,912 B2 * | 12/2011 | Bartels | G06F 11/3476 714/55 |
| 8,266,496 B2 | 9/2012 | Flynn et al. | |
| 8,447,721 B2 | 5/2013 | Eshleman et al. | |

(Continued)

OTHER PUBLICATIONS

Dugas, et al., "About Edge—Cribl Docs", online documentation published by Cribl, Inc. (https://docs.cribl.io/edge/), Feb. 15, 2022, 238 pgs.

(Continued)

*Primary Examiner* — Moustafa M Meky
(74) *Attorney, Agent, or Firm* — Henry Patent Law Firm PLLC

(57) ABSTRACT

In some aspects, an edge-based data collection system discovers, collects, processes, and forwards data in an observability pipeline system. In some implementations, an edge agent of the observability pipeline system runs on a computer node. The edge agent identifies processes running on the computer node; identifies files on the computer node that the processes have opened for writing; accesses log discovery parameters of the observability pipeline system; selects a plurality of files from the identified files according to the log discovery parameters; generates a list of discovered log files that includes a path and a name for each of the plurality of files; adds the list of discovered log files to a list of monitored log files to be monitored by the observability pipeline system; and then monitors the plurality of files to generate input for the observability pipeline system.

24 Claims, 6 Drawing Sheets

(56) References Cited

U.S. PATENT DOCUMENTS

| | | | |
|---|---|---|---|
| 9,464,014 B2* | 10/2016 | Modarresi | B01J 8/0453 |
| 9,767,171 B2* | 9/2017 | Russell | G06F 16/353 |
| 9,800,455 B1* | 10/2017 | Upshur | G06F 11/00 |
| 10,135,705 B2 | 11/2018 | Asenjo et al. | |
| 10,503,623 B2 | 12/2019 | Keller | |
| 10,565,093 B1 | 2/2020 | Herrin et al. | |
| 10,592,521 B2* | 3/2020 | Russell | G06F 11/0766 |
| 10,732,962 B1* | 8/2020 | Florescu | G06F 11/0706 |
| 10,887,159 B2* | 1/2021 | Hughes | H04L 43/0811 |
| 10,996,878 B2 | 5/2021 | Das et al. | |
| 11,308,071 B2 | 4/2022 | Armbrust et al. | |
| 11,366,713 B2* | 6/2022 | Honnappa | G06F 11/3636 |
| 11,461,334 B2* | 10/2022 | Bhattacharjee | H04L 43/08 |
| 11,500,751 B2 | 11/2022 | Kumarasamy et al. | |
| 11,663,219 B1* | 5/2023 | Profirovic | G06F 16/2457 |
| | | | 707/713 |
| 11,727,025 B2* | 8/2023 | Ferrar | G06F 11/0766 |
| | | | 707/811 |
| 2018/0124098 A1 | 5/2018 | Carver et al. | |
| 2018/0365096 A1 | 12/2018 | Mamillapalli et al. | |
| 2019/0042705 A1* | 2/2019 | Zheng | G16B 20/30 |
| 2020/0084086 A1 | 3/2020 | Gupta et al. | |
| 2020/0092180 A1 | 3/2020 | Bajaj et al. | |

OTHER PUBLICATIONS

WIPO, International Search Report and Written Opinion issued in Application No. PCT/US2023/062373 dated May 30, 2023, 9 pages.

Treat, Tyler , "Microservice Observability, Part 2: Evolutionary Patterns for Solving Observability Problems", Brave New Geek, Introspections of a software engineer, Jan. 3, 2020, 13 pages.

* cited by examiner

EDGE-BASED DATA COLLECTION SYSTEM FOR AN OBSERVABILITY PIPELINE SYSTEM

CROSS-REFERENCE TO RELATED APPLICATIONS

This application claims priority to U.S. Provisional Patent Application No. 63/309,905, filed Feb. 14, 2022, entitled "Edge-based Data Collection System for an Observability Pipeline System;" and U.S. Provisional Patent Application No. 63/310,901, filed Feb. 16, 2022, entitled "Edge-based Data Collection System for an Observability Pipeline System." The above-referenced priority documents are incorporated herein by reference in their entireties.

BACKGROUND

The following description relates to edge-based data collection for an observability pipeline system.

Observability pipelines are used to route and process data in a number of contexts. For example, observability pipelines can provide unified routing of various types of machine data to multiple destinations, while adapting data shapes and controlling data volumes. In some implementations, observability pipelines allow an organization to interrogate machine data from its environment without knowing in advance the questions that will be asked. Observability pipelines may also provide monitoring and alerting functions, which allow systematic observation of data for known conditions that require specific action or attention.

DETAILED DESCRIPTION

Figure 1:
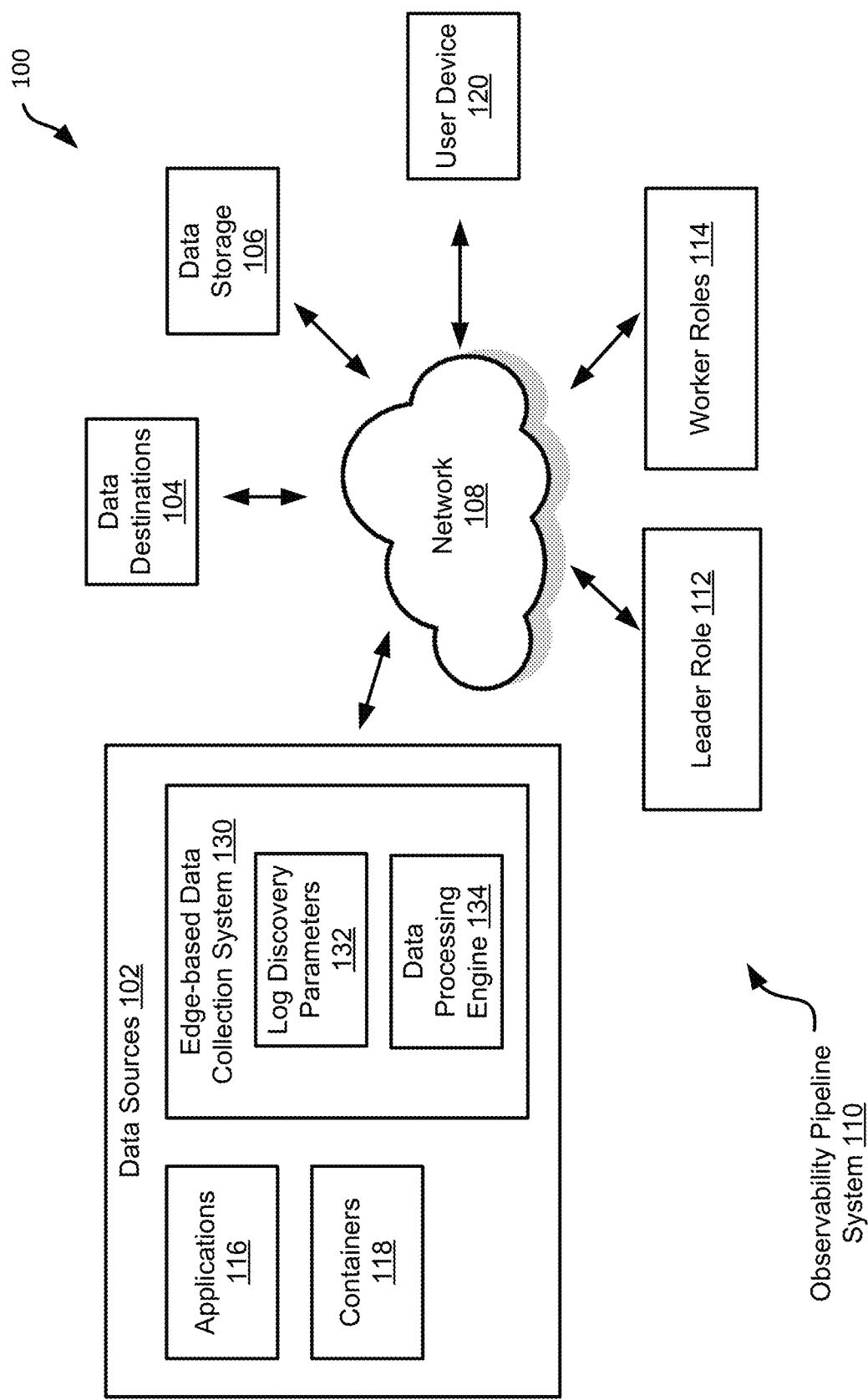
FIG. 1 is a block diagram showing aspects of an example computing environment.

In some aspects of what is described here, log files on a computer node are discovered, data from the log files are extracted, collected, and routed by operation of an edge-based data collection system. In some implementations, the edge-based data collection system operates as an edge agent on a computer node or another type of data source in a computing environment. For example, the edge-based data collection system may operate on a computer device or system where processes run and data originates in a network (e.g., a server, server cluster, a Raspberry Pi device, a PC, a smart device, etc.).

In some cases, the edge-based data collection system includes edge agents of an observability pipeline system installed on multiple end-point devices or other types of computer nodes. In some cases, the edge-based data collection system provides a user interface that allows a user to customize what types of log files are to be monitored by the observability pipeline system. In some cases, the edge-based data collection system may further discover the log files and extract data from the discovered log files. The discovered log files may be added to a list which includes log files to be monitored by the observability pipeline system. In some cases, the user interface of the edge-based data collection system may further allow a user to customize how the data are extracted, formatted, or processed. Based on the list of monitored log files, the edge-based data collection system generates observability pipeline input data for further processing in the observability pipeline system. In some cases, the edge-based data collection system can route data from the discovered log files to data destinations (e.g., a data storage or a user device).

In some implementations, the methods and techniques presented here can provide advantages over existing technologies. For example, an edge-based data collection system can be used for microservice architectures and sprawling environments. The edge-based data collection system may collect, process, and forward data with flexibility and low resource overhead. The edge-based data collection system may have a low cost of ownership, and may be scalable and centrally managed, configured, and version controlled for easy expansion. The edge-based data collection system can be user-experience oriented, for example, allowing users (e.g., through a user interface) to specify log discovery parameters for filtering and selecting log files; to specify and optimize data collection parameters for obtaining data from the selected log files; to obtain information about collected data; and to perform pre-processing to the collected data. In some cases, an edge-based data collection system provides a highly differentiated single node experience. The edge-based data collection system can serve as a steppingstone for distributed user experience. In some implementations, an edge-based data collection system is easy to configure, setup and get started; can provide management at scale; and balance performance and resource utilization. In some cases, a combination of these and potentially other advantages and improvements may be obtained.

FIG. 1 is a block diagram showing aspects of an example computing environment 100. The example computing environment 100 includes data sources 102, data destinations 104, data storage 106, network 108, a user device 120, and an observability pipeline system 110. The observability pipeline system 110 includes a leader role 112, worker roles 114, and an edge-based data collection system that includes edge agents 130 running on the data sources 102. Each edge agent 130 can be deployed as an application or another type of software module running on the computer nodes that operate as data sources 102. The computing environment 100 may include additional or different features, and the elements of the computing environment 100 may be configured to operate as described with respect to FIG. 1 or in another manner.

In some implementations, the computing environment 100 contains the computing infrastructure of a business enterprise, an organization or another type of entity or group of entities. During operation, various data sources 102 in an organization's computing infrastructure produce volumes of machine data that contain valuable or useful information. The machine data may include data generated by the organization itself, data received from external entities, or a combination. By way of example, the machine data can include network packet data, sensor data, application program data, observability data, and other types of data. Observability data can include, for example, system logs, error logs, stack traces, system performance data, or any other data that provides information about computing infrastructure and applications (e.g., performance data and diagnostic information). The observability pipeline system 110 can receive and process the machine data generated by the data sources 102. For example, the machine data can be processed to diagnose performance problems, monitor user interactions, and to derive other insights about the computing environment 100. Generally, the machine data generated by the data sources 102 does not have a common format or structure, and the observability pipeline system 110 can generate structured output data having a specified form, format, or type. The output generated by the observability pipeline system can be delivered to data destinations 104, data storage 106, user devices 120, or a combination of these and other destinations. In some cases, the data delivered to the data storage 106 includes the original machine data that was generated by the data sources 102, and the observability pipeline system 110 can later retrieve and process the machine data that was stored on the data storage 106.

In general, the observability pipeline system 110 can provide a number of services for processing and structuring machine data for an enterprise or other organization. In some instances, the observability pipeline system 110 provides schema-agnostic processing, which can include, for example, enriching, aggregating, sampling, suppressing, or dropping fields from nested structures, raw logs, and other types of machine data. The observability pipeline system 110 may also function as a universal adapter for any type of machine data destination. For example, the observability pipeline system 110 may be configured to normalize, de-normalize, and adapt schemas for routing data to multiple destinations. The observability pipeline system 110 may also provide protocol support, allowing enterprises to work with existing data collectors, shippers, and agents, and providing simple protocols for new data collectors. In some cases, the observability pipeline system 110 can test and validate new configurations and reproduce how machine data was processed. The observability pipeline system 110 may also have responsive configurability, including rapid reconfiguration to selectively allow more verbosity with pushdown to data destinations or collectors. The observability pipeline system 110 may also provide reliable delivery (e.g., at least once delivery semantics) to ensure data integrity with optional disk spooling.

The data sources 102, data destinations 104, data storage 106, observability pipeline system 110, and the user device 120 are each implemented by one or more computer systems that have computational resources (e.g., hardware, software, and firmware) that are used to communicate with each other and to perform other operations. For example, each computer system may be implemented as the example computer system 500 shown in FIG. 5 or components thereof. In some implementations, computer systems in the computing environment 100 can be implemented in various types of devices, such as, for example, laptops, desktops, workstations, smartphones, tablets, sensors, routers, mobile devices, Internet of Things (IOT) devices, and other types of devices. Aspects of the computing environment 100 can be deployed on private computing resources (e.g., private enterprise servers, etc.), cloud-based computing resources, or a combination thereof. Moreover, the computing environment 100 may include or utilize other types of computing resources, such as, for example, edge computing, fog computing, etc.

The data sources 102, data destinations 104, data storage 106, observability pipeline system 110, and the user device 120 and possibly other computer systems or devices communicate with each other over the network 108. The example network 108 can include all or part of a data communication network or another type of communication link. For example, the network 108 can include one or more wired or wireless connections, one or more wired or wireless networks, or other communication channels. In some examples, the network 108 includes a Local Area Network (LAN), a Wide Area Network (WAN), a private network, an enterprise network, a Virtual Private Network (VPN), a public network (such as the Internet), a peer-to-peer network, a cellular network, a Wi-Fi network, a Personal Area Network (PAN) (e.g., a Bluetooth low energy (BTLE) network, a ZigBee network, etc.) or other short-range network involving machine-to-machine (M2M) communication, or another type of data communication network.

The data sources 102 can include multiple user devices, servers, sensors, routers, firewalls, switches, virtual machines, containers, or a combination of these and other types of computer devices or computing infrastructure components. Part of the observability pipeline system 110 on the data sources 102 enable the data sources 102 to detect, monitor, create, or otherwise produce machine data during their operation. In some instances, the machine data may be provided to the leader role 112 or the worker role 114 of the observability pipeline system 110 through the network 108 for further processing. In some cases, the machine data are formatted into pipeline input data to the data processing engine 134 of the edge agent 130

The data sources 102 can include data sources designated as push sources (e.g., Splunk HEC, Syslog, Elasticsearch API, TCP JSON, TCP Raw, HTTP/S, Raw HTTP/S, Kinesis Firehose, SNMP Trap, Metrics, and others), pull sources (e.g., Kafka, Kinesis Streams, SQS, S3, Google Cloud Pub/Sub, Azure Blob Storage, Azure Event Hubs, Office 365 Services, Office 365 Activity, Office 365 Message Trace, Prometheus, and others), and other types of data sources.

In some implementations, the data sources 102 includes applications 116. In the example shown in FIG. 1, an application 116 includes a collection of computer instructions that constitute a computer program. The computer instructions reside in memory and execute on a processor. The computer instructions can be compiled or interpreted. An application 116 can be contained in a single module or can be statically or dynamically linked with other libraries. The libraries can be provided by the operating system or the application provider. The application 116 can be written in a variety of computer languages, including Java, "C," "C++," Python, Pascal, Go, or Fortran as a few examples.

As shown in FIG. 1, the edge agent 130 includes log discovery parameters 132 and a data processing engine 134. In certain cases, the edge agent 130 may include other components. In some implementations, the log discovery parameters 132 specify values that are used to filter or select log files that are accessed by processes running on the one or more data sources. In some instances, the values of the log discovery parameters 132 can be pre-determined at default values by the edge agent 130, for example, when installed on the one or more data sources 102. In some instances, the values of the log discovery parameters 132 can be configured, changed, or updated by a user of the one or more data sources 102 or the leader role 112 of the observability pipeline system 110.

In some implementations, the edge agent 130 operating on a computer node inspects the computer node; identifies processes running on the computer node (e.g., instances of the applications 116 or other types of processes); explores and discovers log files that the processes access; filters and selects a subset of the discovered log files to be monitored according to the log discovery parameters; extracts and formats data from the subset of the discovered log files; pre-process the data by operation of the data processing engine 134; and routes the extracted data or the pre-processed data to a data destination (e.g., a cloud-based centralized node, a user device, a data storage, the leader role 112 or the worker roles 114 of the observability pipeline system 110). In some implementations, the discovered log files are added to a list of monitored log files that are monitored by the observability pipeline system. In some implementations, when one or more of the log discovery parameters 132 are modified based on user input, a different subset of the identified files is selected according to the modified log discovery parameters 132 and the list of monitored log files is updated to include the different subset of the identified files to be monitored by the observability pipeline system.

In some implementations, the data extracted from the discovered log files can be formatted to generate observability pipeline input data which can be processed by the data processing engine 134 to generate observability pipeline output data. The observability pipeline output data from the data processing engine 134 can be forwarded to other components (e.g., the leader role 112 or the worker roles 114) of the observability pipeline system 110 through the network 108 as shown in FIG. 1, where one or more sub-processes can be performed, or to data destinations 104 or data storage 106. In some instances, the edge-based data collection system 130 on a data source 102 can manage multiple other data sources 102. In some implementations, the observability pipeline output data from the data processing engine 134 can be augmented with metadata collected from the computer node. In certain examples, the augmented observability pipeline output data can be further transmitted to data destinations 104. In some implementations, the data processing engine 134 of the edge agent 130 has one or more of the features shown and described in the example data processing engine 200 in FIG. 2. In some examples, the data processing engine 134 of the data source 102 may be implemented in another manner.

The data destinations 104 can include multiple user devices, servers, databases, analytics systems, data storage systems, or a combination of these and other types of computer systems. The data destinations 104 can include, for example, log analytics platforms, time series databases (TSDBs), distributed tracing systems, security information and event management (SIEM) or user behavior analytics (UBA) systems, and event streaming systems or data lakes (e.g., a system or repository of data stored in its natural/raw format). The observability pipeline output data produced by the observability pipeline system 110 can be communicated to the data destinations 104 through the network 108.

The data storage 106 can include multiple user devices, servers, databases, or a combination of these and other types of data storage systems. Generally, the data storage 106 can operate as a data source or a data destination (or both) for the observability pipeline system 110. In some examples, the data storage 106 includes a local or remote filesystem location, a network file system (NFS), Amazon S3 buckets, S3-compatible stores, other cloud-based data storage systems, enterprise databases, systems that provides access to data through REST API calls or custom scripts, or a combination of these and other data storage systems. The observability pipeline output data, which may include the machine data from the data sources 102 as well as data analytics and other output from the observability pipeline system 110, can be communicated to the data storage 106 through the network 108.

The observability pipeline system 110 may be used to monitor, track, and triage events by processing the machine data from the data sources 102. The observability pipeline system 110 can receive an event data stream from each of the data sources 102 and identify the event data stream as observability pipeline input data to be processed by one or more of the data processing engines 134, the leader role 112 or the worker roles 114 of the observability pipeline system 110. The observability pipeline system 110 generates observability pipeline output data by applying observability pipeline processes to the observability pipeline input data and communicates the observability pipeline output data to the data destinations 104. In some implementations, the observability pipeline system 110 operates as a buffer between data sources 102 and data destinations 104, such that some data sources 102 can send their data to the observability pipeline system 110, which handles filtering and routing the data to proper data destinations.

In some implementations, the observability pipeline system 110 unifies data processing and collection across many types of machine data (e.g., metrics, log files, and traces). The machine data can be processed by the observability pipeline system 110 by enriching it and reducing or eliminating noise and waste, or otherwise formatting it. The observability pipeline system 110 may also deliver the processed data to any tool in an enterprise designed to work with observability data. For example, the observability pipeline system 110 may analyze event data and send analytics to multiple data destinations 104, thereby enabling the systematic observation of event data for known conditions which require attention or other action. Consequently, the observability pipeline system 110 can decouple data sources of machine data from data destinations and provide a buffer that makes many, diverse types of machine data easily consumable.

In some example implementations, the observability pipeline system 110 can operate on any type of machine data generated by the data sources 102 to properly observe, monitor, and secure the running of an enterprise's infrastructure and applications 116 while reducing or minimizing overlap, wasted resources, and cost. Specifically, instead of using different tools for processing different types of machine data, the observability pipeline system 110 can unify data collection and processing for all types of machine data (e.g., logs 204, metrics 206, and traces 208 shown in FIG. 2) and route the processed machine data to multiple data destinations 104. Unifying data collection can minimize or reduce redundant agents with duplicate instrumentation and duplicate collection for the multiple destinations. Unifying processing may allow routing of processed machine data to disparate data destinations 104 while adapting data shapes and controlling data volumes.

In an example, the observability pipeline system 110 obtains DogStatsd metrics, processes the DogStatsd metrics (e.g., by enriching the metrics), sends processed data having high cardinality to a first destination (e.g., Honeycomb) and processed data having low cardinality to a second, different destination (e.g., Datadog). In another example, the observability pipeline system 110 obtains windows event logs, sends full fidelity processed data to a first destination (e.g., an S3 bucket), and sends a subset (e.g., where irrelevant events are removed from the full fidelity processed data) to one or more second, different destinations (e.g., Elastic and Exabeam). In another example, machine data can be obtained from a Splunk forwarder and processed (e.g., sampled). The raw processed data may be sent to a first destination (e.g., Splunk). The raw processed data may further be parsed, and structured events may be sent to a second destination (e.g., Snowflake).

In some implementations, the leader role 112 of the observability pipeline system 110 leads the overall operation by configuring and monitoring the worker roles 114 of the observability system 110. The worker roles 114 of the observability pipeline system 110 may receive observability pipeline output data from the data processing engine 134 of the edge agent 130 on the data sources 102, and may apply further observability pipeline processes to the received data, and deliver pipeline output data to the data destinations 104 and data storage 106.

The observability pipeline system 110 may deploy the leader role 112 and a number of worker roles 114 on a single computer node or on many computer nodes. For example, the leader role 112 and one or more worker roles 114 may be deployed on the same computer node. Or in some cases, the leader role 112 and each of the worker roles 114 may be deployed on distinct computer nodes. The distinct computer nodes can be, for example, distinct computer devices, virtual machines, containers, processors, or other types of computer nodes.

The user device 120 or another computer node in the observability pipeline system 110 can provide a user interface for the observability pipeline system 110. Aspects of the user interface can be rendered on a display (e.g., the display 550 in FIG. 5) or otherwise presented to a user. The user interface may be generated by an observability pipeline application that interacts with the observability pipeline system 110. The observability pipeline application can be deployed as software that includes application programming interfaces (APIs), graphical user interfaces (GUIs), and other modules.

In some implementations, an observability pipeline application (e.g., the edge agent 130, or another type of application or software module) can be deployed as a file, executable code, or another type of machine-readable instructions executed on a computer node. The observability pipeline application, when executed, may render GUIs for display to a user (e.g., on a touchscreen, a monitor, or other graphical interface device), and the user can interact with the observability pipeline application through the GUIs. Certain functionality of the observability pipeline application may be performed on the data sources 102 or the user device 120 or may invoke the APIs, which can access functionality of the observability pipeline system 110. The observability pipeline application may be rendered and executed within another application (e.g., as a plugin in a web browser), as a standalone application, or otherwise. In some cases, an observability pipeline application may be deployed as an installed application on a workstation, as an "app" on a tablet or smartphone, as a cloud-based application that accesses functionality running on one or more remote servers, or otherwise.

In some implementations, multiple components or aspects of the observability pipeline system 110 are deployed on a single computer node, for example, on a data source 102 or another computer device in the computing environment 100. The computer node can operate as one or more of the edge agent 130, the leader role 112 and the worker roles 114 and may execute an observability pipeline application that provides a user interface as described above. In some cases, the edge agents 130, the leader role 112 and each of the worker roles 114 are deployed on distinct components (e.g., distinct processors, distinct cores, distinct virtual machines, etc.) within a single computer node. In such cases, they can communicate with each other by exchanging signals within the computer device, through a shared memory, or otherwise.

In some implementations, the observability pipeline system 110 is deployed on a distributed computer system that includes multiple computer nodes. For instance, the observability pipeline system 110 can be deployed on a server cluster, on a cloud-based "serverless" computer system, or another type of distributed computer system. The computer nodes in the distributed computer system may include a number of endpoint devices operating as data sources 102, a leader node operating as the leader role 112 and multiple worker nodes operating as the respective worker roles 114. One or more computer nodes of the distributed computer system (e.g., the leader node) may communicate with the user device 120, for example, through an observability pipeline application that provides a user interface as described above. In some cases, the data sources, the leader node and each of the worker nodes are distinct computer devices in the computing environment 100. In some cases, the data sources, the leader node and each of the worker nodes can communicate with each other using TCP/IP protocols or other types of network communication protocols transmitted over a network (e.g., the network 108 shown in FIG. 1) or another type of data connection.

In some implementations, the observability pipeline system 110 includes software installed on private enterprise servers, a private enterprise computer device, or other types of enterprise computing infrastructure (e.g., one or more computer systems owned and operated by corporate entities, government agencies, other types of enterprises). In such implementations, some or all of the data sources 102, data destinations 104, data storage 106, and the user device 120 can be or include the enterprise's own computer resources, and the network 108 can be or include a private data connection (e.g., an enterprise network or VPN). In some cases, the observability pipeline system 110 and the user device 120 (and potentially other elements of the computer environment 100) operate behind a common firewall or other network security system.

In some implementations, the observability pipeline system 110 includes software running on a cloud-based computing system that provides a cloud hosting service. For example, the observability pipeline system 110 may be deployed as a SaaS system running on the cloud-based computing system. For example, the cloud-based computing system may operate through Amazon® Web Service (AWS) Cloud, Microsoft Azure Cloud, Google Cloud, DNA Nexus, or another third-party cloud. In such implementations, some or all of the data sources 102, data destinations 104, data storage 106, and the user device 120 can interact with the cloud-based computing system through APIs, and the network 108 can be or include a public data connection (e.g., the Internet). In some cases, the observability pipeline system 110 and the user device 120 (and potentially other elements of the computer environment 100) operate behind different firewalls, and communication between them can be encrypted or otherwise secured by appropriate protocols (e.g., using public key infrastructure or otherwise).

In some implementations, the data sources 102 each include one or more containers 118, and an edge agent 130 running on a data source can identify files and monitor data in the containers 118 running on that data source. When the identified files include a file defined in a container 118, a modified path for the file can be identified by operation of the edge agent 130. In some implementations, the modified path allows a process (e.g., the edge agent 130) running outside the container to access the file in the container 118.

In some implementations, the edge agent 130 is operated in one of the containers 118 on the data source 102. In this case, when identifying processes running on the computer node, a root file system of the computer node can be mounted, and the edge agent 130 can identify processes running in other containers 118 of the computer node by scanning the root file system. In some implementations, a container discovery process is performed to identify containers running on the computer node. Console log files in each of the containers are detected; and a list of the console log files is added to the list of monitored log files to be monitored by the observability pipeline system 110. In some implementations, console logs in each of the containers are detected and collected through one or more sockets.

In some instances, container metrics for one or more of the containers 118 are collected, and observability pipeline input data is generated by formatting the container metrics. The observability pipeline input data can then be processed by the data processing engine 134 of the edge agent 130. When the observability pipeline input data is processed, resource utilization on the computer node and a duration of processing can be measured and determined.

Figure 2:
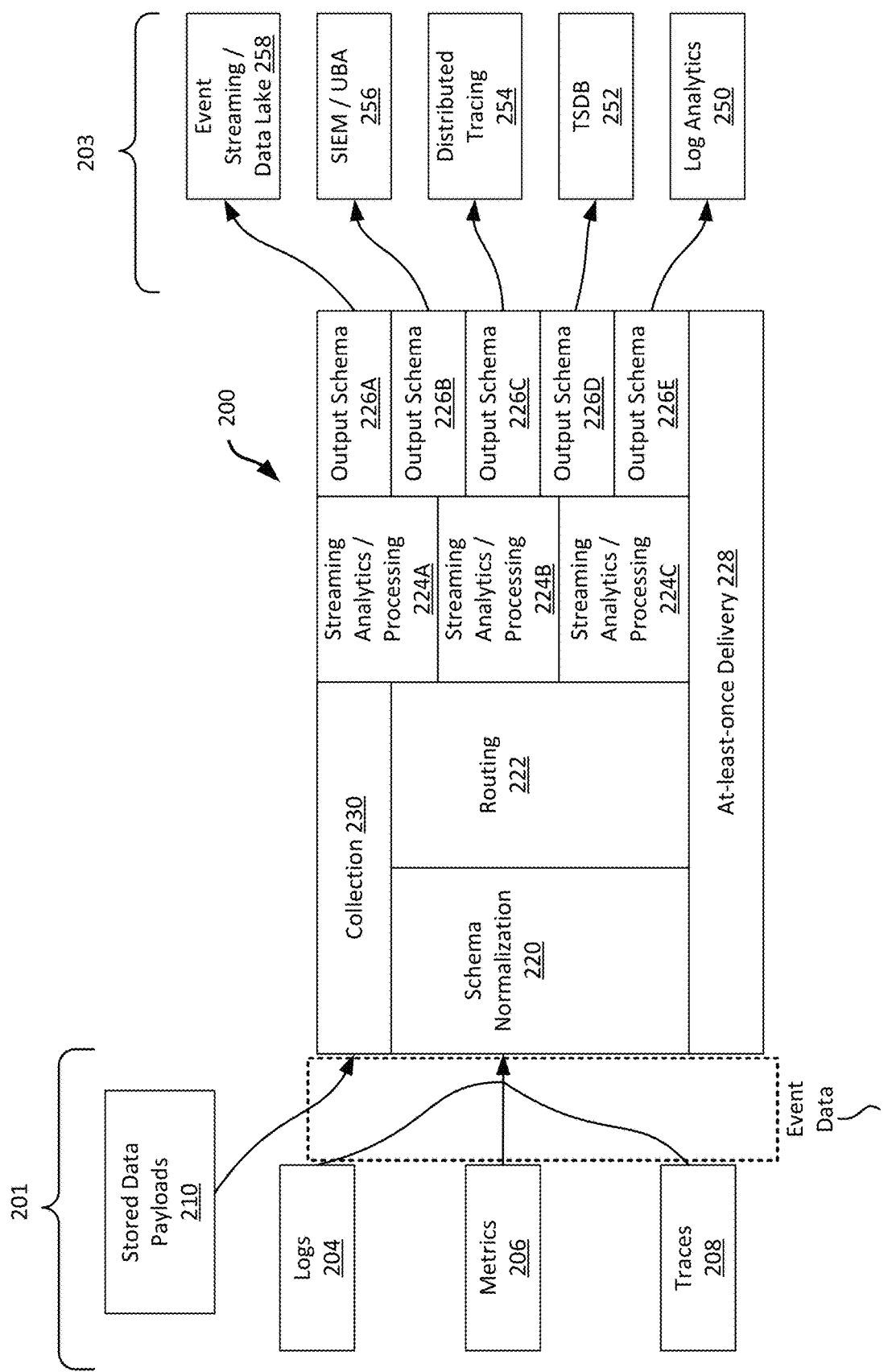
FIG. 2 is a block diagram showing aspects of an example data processing engine.

FIG. 2 is a block diagram showing aspects of an example data processing engine 200. The example the data processing engine 200 may be implemented by one or more of the data sources 102, the leader role 112, the worker roles 114 or other components shown in FIG. 1, or the data processing engine 200 may be implemented in another type of system.

The example data processing engine 200 shown in FIG. 2 includes data collection 230, schema normalization 220, routing 222, streaming analytics and processing 224A, 224B, 224C, and output schematization 226A, 226B, 226C, 226D, 226E. The data processing engine 200 may include additional or different operations, and the operations of the data processing engine 200 may be performed as described with respect to FIG. 2 or in another manner. In some cases, one or more of the operations can be combined, or an operation can be divided into multiple sub-processes. Certain operations may be iterated or repeated, for example, until a terminating condition is reached. In some cases, one or more of the operations may receive observability pipeline input data 201 generated by an edge agent operating on an endpoint device or another data source.

As shown in FIG. 2, the data processing engine 200 is applied to observability pipeline input data 201 from data sources, and the data processing engine 200 delivers pipeline output data 203 to data destinations. The data sources can include any of the example data sources 102 or data storage 106 described with respect to FIG. 1, and the data destinations can include any of the example data destinations 104 or data storage 106 described with respect to FIG. 1.

The example observability pipeline input data 201 shown in FIG. 2 includes logs 204, metrics 206, traces 208, stored data payloads 210, and possibly other types of machine data. In some cases, some or all of the machine data can be generated by agents (e.g., Fluentd, Collectd, OpenTelemetry) that are deployed at the data sources, for example, on various types of computing devices in a computing environment (e.g., in the computing environment 100 shown in FIG. 1, or another type of computing environment). The logs 204, metrics 206, and traces 208 can be decomposed into event data 202 that are consumed by the data processing engine 200. In some instances, logs 204 can be converted to metrics 206, metrics 206 can be converted to logs 204, or other types of data conversion may be applied. In some cases, the logs 204, metrics 206, traces 208, and stored data payloads 210 that constitute the example observability pipeline input data 201, may be provided by an edge agent 130 as shown in FIG. 1 or another type of agent.

In the example shown, the stored data payloads 210 represent event data retrieved from external data storage systems. For instance, the stored data payloads 210 can include event data that an observability pipeline process previously provided as output to the external data storage system.

The event data 202 are streamed to the data processing engine 200 for processing. Here, streaming refers to a continual flow of data, which is distinct from batching or batch processing. With streaming, data are processed as they flow through the system continuously (as opposed to batching, where individual batches are collected and processed as discrete units). As shown in FIG. 2, the event data from the logs 204, metrics 206, and traces 208 are streamed directly to the schema normalization process (at 220) without use of the collection process (at 230), whereas the event data from the stored data payloads 210 are streamed to the collection process (at 230) and then streamed to the schema normalization process (at 220), the routing process (at 222) or the streaming analytics and processing (at 224).

In some instances, event data 202 represents events as structured or typed key value pairs that describe something that occurred at a given point in time. For example, the event data 202 can contain information in a data format that stores key-value pairs for an arbitrary number of fields or dimensions, e.g., in JSON format or another format. A structured event can have a timestamp and a "name" field. Instrumentation libraries can automatically add other relevant data like the request endpoint, the user-agent, or the database query. In some implementations, components of the events data 202 are provided in the smallest unit of observability (e.g., for a given event type or computing environment). For instance, the event data 202 can include data elements that provide insight into the performance of the computing environment 100 to monitor, track, and triage incidents (e.g., to diagnose issues, reduce downtime, or achieve other system objectives in a computing environment).

In some instances, logs 204 represent events serialized to disk, possibly in several different formats. For example, logs 204 can be strings of text having an associated timestamp and written to a file (often referred to as a flat log file). The logs 204 can include unstructured logs or structured logs (e.g., in JSON format). For instance, log analysis platforms store logs as time series events, and the logs 204 can be decomposed into a stream of event data 202.

In some instances, metrics 206 represent summary information about events, e.g., timers or counters. For example, a metric can have a metric name, a metric value, and a low cardinality set of dimensions. In some implementations, metrics 206 can be aggregated sets of events grouped or collected at regular intervals and stored for low cost and fast retrieval. The metrics 206 are not necessarily discrete and instead represent aggregates of data over a given time span. Types of metric aggregation are diverse (e.g., average, total, minimum, maximum, sum-of-squares) but metrics typically have a timestamp (representing a timespan, not a specific time); a name; one or more numeric values representing some specific aggregated value; and a count of how many events are represented in the aggregate.

In some instances, traces 208 represent a series of events with a parent/child relationship. A trace may provide information of an entire user interaction and may be displayed in a Gantt-chart like view. For instance, a trace can be a visualization of events in a computing environment, showing the calling relationship between parent and child events, as well as timing data for each event. In some implementations, individual events that form a trace are called spans. Each span stores a start time, duration, and an identification of a parent event (e.g., indicated in a parent-id field). Spans without an identification of a parent event are rendered as root spans.

The example observability pipeline output data 203 shown in FIG. 2 include data formatted for log analytics platforms (250), data formatted for time series databases (TSDBs) (252), data formatted for distributed tracing systems (254), data formatted for security information and event management (SIEM) or user behavior analytics (UBA) systems 256, and data formatted for event streaming systems or data lakes 258 (e.g., a system or repository of data stored in its natural/raw format). Log analytics platforms are configured to operate on logs to generate statistics (e.g., web, streaming, and mail server statistics) graphically. TSDBs operate on metrics; example TSDBs include Round Robin Database (RRD), Graphite's Whisper, and OpenTSDB. Tracing systems operate on traces to monitor complex interactions, e.g., interactions in a microservice architecture. SIEMs provide real-time analysis of security alerts generated by applications and network hardware. UBA systems detect insider threats, targeted attacks, and financial fraud. Observability pipeline output data 203 may be formatted for, and delivered to, other types of data destinations in some cases.

In the example shown in FIG. 2, the data processing engine 200 includes a schema normalization module that (at 220) converts the various types of event data 202 to a common schema or representation to execute shared logic across different agents and data types. For example, machine data from various agents such as Splunk, Elastic, Influx, and OpenTelemetry have different, opinionated schemas, and the schema normalization module can convert the event data to normalized event data. Machine data intended for different destinations may need to be processed differently. Accordingly, the data processing engine 200 includes a routing module that (at 222) routes the normalized event data (e.g., from the schema normalization module 220) to different processing paths depending on the type or content of the event data. The routing module can be implemented by having different streams or topics. The routing module routes the normalized data to respective streaming analytics and processing modules. FIG. 2 shows three streaming analytics and processing modules, each applied to normalized data (at 224A, 224B, 224C); however, any number of streaming analytics and processing modules may be applied. Each of the streaming analytics and processing modules can aggregate, suppress, mask, drop, or reshape the normalized data provided to it by the routing module. The streaming analytics and processing modules can generate structured data from the normalized data provided to it by the routing module. The data processing engine 200 includes output schema conversion modules that (at 226A, 226B, 226C, 226D, 226E) schematize the structured data provided by the streaming analytics and processing modules. The structured data may be schematized for one or more of the respective data destinations to produce the observability pipeline output data 203. For instance, the output schema conversion modules may convert the structured data to a schema or representation that is compatible with a data destination. In some implementations, the data processing engine 200 includes an at-least-once delivery module that (at 228) applies delivery semantics that guarantee that a particular message can be delivered one or more times and will not be lost. In some implementations, the data processing engine 200 includes an alerting or centralized state module, a management module, or other types of sub-processes.

In the example shown in FIG. 2, the data processing engine 200 includes a collection module that (at 230) collects filtered event data from stored data payloads 210. For example, the stored data payloads 210 may represent event data that were previously processed and stored on the event streaming/data lake 258 or event data that were otherwise stored in an external data storage system. For example, some organizations have a high volume of data that is kept in storage systems (e.g., S3, Azure Blob Store, etc.) for warehousing purposes, or they may have event data that can be scraped from a REST endpoint (e.g., Prometheus). The collection module may allow organizations to apply the data processing engine 200 to data from storage, REST endpoints, and other systems regardless of whether the data has been processed by an observability pipeline system in the past. The data collection module can retrieve the data from the stored data payload 210 on the external data storage system, stream the data to the data processing engine 200 (e.g., via the schema normalization module, the routing module, or a streaming analytics and processing module), and send the output to any of the data destinations 230.

Figure 3:
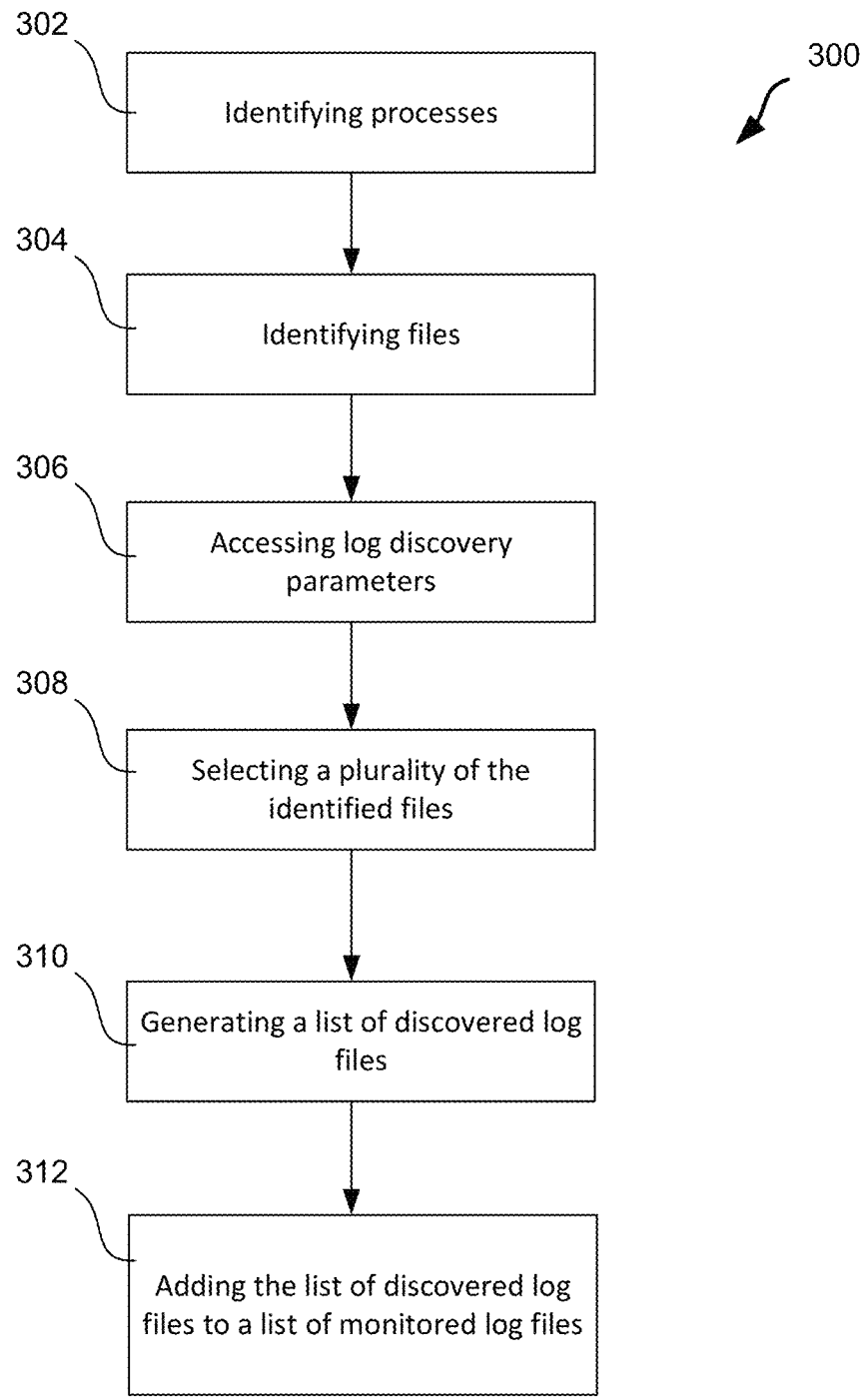
FIG. 3 is a flow chart showing aspects of an example process performed by an edge agent of an observability pipeline system.

FIG. 3 is a flow chart showing aspects of an example process 300. In some implementations, the operations of the example process 300 are performed by an edge agent (e.g., the edge agent 130 shown in FIG. 1) on an endpoint device or another type of computer node (e.g., the data source 102 shown in FIG. 1), and the edge agent operates as part of an observability pipeline system as (e.g., as described with respect to FIG. 1 or in another manner). The example process 300 may include additional or different operations, including operations performed by additional or different components, and the operations may be performed in the order shown or in another order.

In some implementations, the edge agent is configured to collect level 0 host metrics (e.g., CPU, memory, disk, network, etc.) of the computer node. In some implementations, the edge agent is configured to discover if the computer node is running docker or is a k8s (Kubernetes) node and collect level 0 container metrics. In some implementations, the edge agent is configured to discover running processes (e.g., containerized or not containerized) and their corresponding log files. In this case, the edge agent is configured to correlate dockerd/containerd log paths to corresponding containers and resolve actual paths of the log files of containerized applications. In some implementations, the edge agent is configured to discover networks, volumes, pods, and namespaces. In some implementations, the edge agent is configured to provide other functionalities and perform other tasks. In some instances, the edge agent can be installed and configured on the computer node prior to being initiated for performing the operations in the example process 300.

In some implementations, the edge agent provides a user interface that allows the users to explore the discovered metrics (e.g., host, docker, k8s, etc.) of the computer node; to view, explore and search the discovered log files; and to configure the edge agent. For example, through the user interface of the computer node, users can change collection level for some or all metrics; route some or all of extracted data to a data destination (e.g., through packs/pipelines); use interposed functions to attach to running processes for deeper introspection; or configure other aspects of the edge agent.

At 302, processes running on the computer node are identified. For example, processes running on the computer node can be identified by directly scanning a list of running processes on the computer node, for example by accessing the operating system of the computer node using/proc/*. In some implementations, the edge agent identifies running processes on the computer node based on certain criteria, e.g., resource utilization, process duration, or another factor. For example, running processes that utilize at least X % CPU, at least Y % memory may be identified. For another example, processes that run for at least Z seconds may be identified. This heuristic process can be used to identify "relevant" applications.

In some implementations, identifying the processes running on the computer node includes identifying processes that are running in one or more containers on the computer node. In some implementations, a docker discovery process is used to obtain container metrics. In some instances, a docker discovery process can be used to report an inventory of containers on the computer node. In some instances, an API socket can be located for a docker server. Locations for the operating system (e.g., Linux distros, MacOS, windows, etc.) of the computer node can be searched. In response to a process running in a container where a file system of the computer node has been mounted, the same locations in the mounted volume can be searched. In some implementations, once the API socket is located, an event reporting details for the docker server, e.g., version, uptime, number of containers running and stopped, number of images, labels, numbers of volumes mounted, numbers of networks connected, resource usage, and other container metrics can be created. In some instances, these details obtained at the docker API socket can be used to locate files where respective console logs for respective running containers are stored. The list of containers can be filtered, for example according to the container metrics, and the console logs can be collected. In some instances, a similar container discovery process can be used to collect and generate metrics for the K8s cluster, each node, each pod, and each container for Kubernetes deployments. In this discovery process, the API socket can be searched; and K8s container console logs can be also collected.

In some instances, a process can be running in a container of the computer node isolated from the operating system of the computer node. A process ID lists control groups that the running process uses, and a container ID can be extracted from the control groups. For example, a Linux process ID (PID), /proc/{PID}/cgroup lists the control groups (e.g., "namespaces") that a process uses. On a computer node with cgroup v1 enabled, example entries for a process that is running on the computer node and not running in a container are given as

```
12:memory:/user.slice/user-1000.slice/session-1530.scope
11:pids:/user.slice/user-1000.slice/session-1530.scope 10:hugetlb:/
9:blkio:/user.slice
8:cpuset:/
7:freezer:/
6:devices:/user.slice
5:cpu,cpuacct:/user.slice
4:net_cls,net_prio:/
3:rdma:/
2:perf_event:/
1:name=systemd:/user.slice/user-1000.slice/session-1530.scope
0::/user.slice/user-1000.slice/session-1530.scope
```

Example entries for a process that is running in a container of a computer node are given as

```
12:memory:/docker/31aa1bcbffaf974e10526453fb7b645241557f29c3262157cf670b9332762438
11:pids:/docker/31aa1bcbffaf974e10526453fb7b645241557f29c3262157cf670b9332762438
10:hugetlb:/docker/31aa1bcbffaf974e10526453fb7b645241557f29c3262157cf670b9332762438
9:blkio:/docker/31aa1bcbffaf974e10526453fb7b645241557f29c3262157cf670b9332762438
8:cpuset:/docker/31aa1bcbffaf974e10526453fb7b645241557f29c3262157cf670b9332762438
7:freezer:/docker/31aa1bcbffaf974e10526453fb7b645241557f29c3262157cf670b9332762438
6:devices:/docker/31aa1bcbffaf974e10526453fb7b645241557f29c3262157cf670b9332762438
5:cpu,cpuacct:/docker/31aa1bcbffaf974e10526453fb7b645241557f29c3262157cf670b9332762438
4:net_cls,net_prio:/docker/31aa1bcbffaf974e10526453fb7b645241557f29c3262157cf670b9332762438
3:rdma:/
2:perf_event:/docker/31aa1bcbffaf974e10526453fb7b645241557f29c3262157cf670b9332762438
1:name=systemd:/docker/31aa1bcbffaf974e10526453fb7b645241557f29c3262157cf670b9332762438
0::/system.slice/containerd.service
```

In this case, the container ID of 31aa1bcbffaf974e1-0526453fb7b645241557f29c3262157cf670b9332762438 can be extracted from the example entries for the process. For another example, on a computer node with cgroup v2 enabled, example entries for a process that is running on the computer node and not in a container are given as:

```
0::/user.slice/user-
1000.slice/user@1000.service/app.slice/snap.code.code.63e42 2e0-
8525-4103-8946-f8c84e89d2b8.scope
```

Example entries for a process that is running in a container are given as:

```
0::/system.slice/docker-
d139ba47385b92595718f325669fb88a0a3e0feabe770dbb778264f402727524.scope
```

In some instances, an expression, e.g., /docker[-\\]([a-fa-F0-9]+)/can be used to check for and extract the docker container ID from the process' cgroupfile.

In some implementations, the edge agent includes metadata collector agents that are used to discover metadata and report specific defaults and configurations on the computer node. The metadata can be automatically added to events from any source that record various aspects of the computer node it's running. In some implementations, metadata includes details about the edge agent (e.g., version, configuration, etc.), details about the operating system of the computer node (e.g., name, version, hostname, user and group IDs, CPU, and memory resources, network interfaces, etc.), and names and values of all the environment variables. In some instances, when the AWS collector is connected to an application programing interface (API) that is available in EC2 instances, the metadata includes AWS region, instance type, labels, VPC, etc. for the VM. In some instances, the metadata may include other information about the computer node. The metadata may be processed by the observability pipeline system or may be augmented by observability pipeline output data. In some examples, the metadata processed or augmented can then be sent to a data destination (e.g., a data storage, or a user device).

In some cases, the edge agent, when installed on the computer node, includes stock configurations that can provide users with immediate visibility into the computer node by providing information such as: resource usage metrics (e.g., system wide or by process), container events and metrics (e.g., docker/k8s events and metrics), corresponding log files of the running processes, or other information. In some implementations, the above information is available to the user without performing additional configuration to the edge agent after it is installed on the computer node.

At 304, files that the respective processes have opened for writing on the computer node are identified. In some instances, files that the identified running processes have opened can be directly accessed. For example, these files can be accessed by /proc/{pid}/fd/*. In some instances, files that the identified running processes have opened can be identified using the heuristics process. For example: ls-lab/proc/*/fd|grep-e'/log/'-e'.log$'. In some implementations, the edge agent can use additional or different types of heuristic processes, including those that are customizable by the user according to a define pattern, to identify files that are accessed by running processes on the computer node. In some instances, sockets and other non-file entries, files that are not open for writing, files/paths that are not matching the defined patterns may not be identified as files that are to be monitored by the observability pipeline system. In some implementations, files accessed by containerized processes or applications are identified.

At 306, log discovery parameters of the observability pipeline system are accessed. In some implementations, the log discovery parameters are configured to define a set of criteria that can be applied to filter the identified files. In some implementations, the log discovery parameters include a file type parameter, a file path parameter, a file name parameter, or other types of parameters, including modification time of a file (e.g., last time a file was modified or accessed etc.), file's owner or group, file's permissions, etc. In some instances, log discovery parameters are specified at default values when the edge agent is installed on the computer node. The log discovery parameters and their values may be changed or updated, for example, by a user of the computer node through the user interface where the edge agent is operated on or the leader role of the observability pipeline system. In some instances, a user can provide input or feedback through the user interface to the edge agent of the computer node in response to a list of discovered log files are presented to the user. For example, a user can remove one or more existing log discovery parameters, add one or more new log discovery parameters, update, edit or otherwise specify values for the log discovery parameters, or another type of action. In some instances, the log discovery parameters of the observability pipeline system may be stored locally on the computer node or remotely on the leader role of the observability pipeline system which can be accessed by the computer node through the network (e.g., the network 108 in FIG. 1).

At 308, a subset of the identified files is selected according to the log discovery parameters. After accessing the log discovery parameters, criteria defined by values of the log discovery parameters are applied to the identified files. In some implementations, the identified files are filtered, and a subset of the identified files is selected according to the log discovery parameters.

In some instances, users can configure the edge agent on the computer node to directly specify directories of files to be monitored. For example, users can specify a directory where files are stored, and criteria (e.g., defined by the log discovery parameters) to filter files in the directory, e.g., via a regex. The selected subset of the identified files can be continuously monitored by the edge agent for new content being appended, reads and forwards the data.

In some implementations, the edge agent includes a log data collection agent. The log data collection agent can be configured to automatically discover log files based on a heuristic process. In some cases, the log data collection agent is programmed with certain assumptions such as, for example, if a process is writing to a log file, the log file is important and collected/forwarded. A log data collection operation performed by the log data collection agent in the edge agent includes two steps, e.g., a discover stage and a collection stage.

In some cases, during the discover stage, the log data collection agent can identify (and resolve the path of) files to be collected under automated mode or manual mode. In some implementations, under automated mode, log files to be collected can be automatically discovered by identifying log files being written to during running processes. Users can be provided with a great experience under default configurations by providing the ability to automatically discover interesting things to observe, e.g., system metrics, container metrics if a container engine is running, logs, etc. In some implementations, under the manual mode, log files or directories to collect are specified by users. In some instances, under the automated mode, all running processes are periodically checked (operation 302); look at the files the running processes have opened for writing (operation 304); and apply a (configurable) filter defined by log discovery parameters of the observability pipeline system to select log files (operations 306 and 308). In certain instances, some running processes may not be automatically discovered. For example, when a running process is very short, e.g., bash scripts, etc. In this case, users can manually configure additional sources on the computer node to access and collect data from corresponding log files of these processes.

In some cases, to assist users with visibility into what has been discovered or what may be discovered (e.g., allow users to preview which log files would be identified under a given filter, or which log files have been discovered so far and would be processed), the discover stage can be performed on-demand and performed independently from the collection stage.

At 310, a list of discovered log files is generated. Once the subset of the identified files is selected according to the log discovery parameters, respective paths, and names of files in the subset of the identified files can be determined; and a list of discovered log files which includes the respective paths and names of the files in the selected subset can be generated. In some instances, the list of discovered log files may include other parameters of the selected subset of the identified files. For example, the list of discovered log files may further include program name, process ID, user, group, or another property of the file or the corresponding process.

In some implementations, a path of a selected file to be monitored can be determined according to locations of the edge agent and the process on the computer node. For example, each of the process and the edge agent may be running on a computer node or in a container isolated from the operating system of the computer node.

In some implementations, the edge agent runs in a container isolated from the operating system of the computer node; and the container is mounted with a root file system which includes all or parts of the details of the computer node. For example, a root file system can be mounted on the container using /hostfs. In this case, a process running on the computer node instead of running in the container can be identified, for example, by scanning /host/proc/*; and a process running in a container can be identified, for example by scanning /proc/*. In other words, the path to a corresponding file that the process has open needs to be adjusted to account for this indirection. When a process running on the computer node is identified and the process writes to a file at /tmp/foo.log, the actual path of the file that the edge agent uses to collect data is /hostfs/tmp/foo.log.

When a file accessed by a containerized process is identified, the path of the file in the containerized process can be determined from the container's root. For example, the file can be accessed by using /proc/<pid>/root/<log-file-path> or by identifying the top file system layer (upperdir) for the process in the overlay file system (e.g., overlayfs) (usually this dir ends with /diff) then using <upperdir>/<log-file-path> as the file to monitor.

cat /proc/<pid>/mounts | grep '/'
overlay / overlay rw,relatime,lowerdir=/var/lib/docker/overlay2/1
/3RATKUACGGTRO7RKLLVFJO5R2F:/var/lib/docker/overlay2/1
/CTWRFVMH54ZOHKZPHNWHWBW6SY,upperdir=/var/lib/docker/overlay2
/fcfcd4fb34decca0c75952181ff3172c15d3c0611b0f673cbe16e32e599f19c8/diff,workdir=/var/lib/docker/overlay2
/fcfcd4fb34decca0c75952181ff3172c15d3c0611b0f673cbe16e32e599f19c8/work,xino=off 0 0

In certain instances, a container ID of the containerized process can be determined by looking at /proc/<pid>/cgroup or elsewhere, for example:

root@ledion-Virtual-Machine:/proc/1# cat /proc/<pid>/cgroup | grep pids
4:pids:/docker
/cb1d43cbf538d5a851efa0a849497ecd6e0e5c0d6cc5e84ec563dcc6a2160cf3

In some implementations, the edge agent runs directly on the computer node. In this case, a process running in a container isolated from the operating system of the computer node writes to a file. This path of the file can be resolved by processes running inside the same container. In some instances, the container ID of container where the process is running can be identified; and the container ID can then be used to obtain the container details, for example, from the Docker API. The container details include the path on the file system of the computer node where the containers internal file system is built. In some implementations, the container path is then used to prefix the file path to obtain the actual path. For example, when a file path is /tmp/foo.log, and the container path is /var/lib/docker/overlay2/e0b . . . 542a/ merged, the actual path of the file is determined as /var/lib/ docker/overlay2/e0b . . . 542a/merged/tmp/foo.log.

In some implementations, the edge agent and the process are running on separate, distinct containers in the same computer node. For example, the edge agent may run in a first container while a process is running in a second, distinct container, and the actual path of the corresponding file where the process writes to is /hostfs/var/lib/docker/overlay2/ e0b . . . 542a/merged/tmp/foo.log.

In some implementations, a symbolic link (e.g., symblink or soft link) includes a path or link that point to a log file or another entry. A symbolic link is a filesystem entry. In some instances, a symbolic link may be included in the container details of a container. In certain examples, the use of symbolic links may affect the Auto Log Discovery process. In some instances, when a symbolic link in container environments leads to a filesystem, the filesystem can be mapped; and its path can be translated so as to allow the access of the logs during a log-writing process.

At 312, the list of discovered log files is added to a list of monitored log files. In some implementations, the list of discovered log files including the paths and names of the selected subset of the identified files is added to the list of monitored log files. The list of monitored log files includes data of files that are monitored by the observability pipeline system. In some instances, the list of monitored log files may be stored locally on the same computer node, for example in a memory device of the compute node (e.g., the memory 520 in FIG. 5) which can be accessed by the data processing engine of the edge agent of the computer node. In some instances, the list of monitored log files may be stored remotely on other locations. For example, the list of monitored log files may be stored remotely on the leader role of the observability pipeline system and the list of discovered log files can be transferred through the network and added to the list of monitored log files. In some implementations, the data processing engine 134 of the edge agent 130 can monitor files according to the list of discovered log files. In some implementations, data is extracted from the list of discovered log files and the extracted data is formatted and used to generate observability pipeline input data for the data processing engine. The observability pipeline input data is then processed by operation of the data processing engine on the computer node to generate observability pipeline output data.

In some cases, during the collection stage, a file is effectively monitored for new data appended, and bytes written to the log file can be processed. The log data collection agent of the edge agent can be configured to continuously read from the files and forward the data. In some cases, files are assumed to be append-only files, which can be rotated and optionally compressed after rotation.

In some implementations, the operations of the example process 300 are executed by operation of a process unit of the computer node during the log data collection. In certain implementations, when the computer node includes multiple processor units or multiple cores with multiple applications running in parallel, data that is generated from such data source (e.g., a k8s node) could be enormous for a single worker process to handle. In this case, the edge agent can be scaled. For example, the log data collection agent of the edge agent can be divided into two or more worker processes. One worker process can be configured for discovering files, during the discover stage. After the discover stage, discovered paths can be distributed to other worker processes during which the log collection stage is performed. In some implementations, dividing the log data collection agent into multiple worker processes for different operations is performed and coordinated by operation of RPC (remote procedure calls), API (application programming interfaces) servers, or other components/units.

In some implementations, the edge agent is capable of handling discovered files that have skewed write rates, e.g., in situations like where an application is being run in debug or other situations. For example, when a writing rate on a discovered file is much faster than others, data on the discovered file is more than others. To ensure that all discovered files are treated fairly, an algorithm can be implemented for reading data from the discovered files. The algorithm allows reading data in a round robin fashion instead of reading data until EOF of a particular discovered file. For example, the algorithm may specify a size of data (e.g., 64 KB or another size) to read from each discovered file during any duty cycle.

In some implementations, the edge agent is configured to collect oily (observability) data or other types of data. In some implementations, the edge agent is configured according to user's instructions specified by data collection parameters. The edge agent can collect values of data collection parameters from the users. For example, users may specify values of the data collection parameters, such as level of time granularity (e.g., 1 minute, 10 seconds, 1 second, or another time interval), level of dimensional granularity, whether it needs utilization by vCPU, net rx/tx by interface, or other data collection parameters.

In some implementations, one or more data collection parameters may be grouped together into multiple distinct levels. For instance, users may have the opportunity to select "o11y level". In some instances, o11y level may include three levels. For example, level 0 provides metrics aggregated at the system level (e.g., no per core, or process etc.); level 1 breaks down metrics by properties of the system (e.g., vCPU, network interface, mountpoint, etc.); and level 2 breaks down metrics by process. Parameters may be handled in another manner in some cases.

Figure 4A:
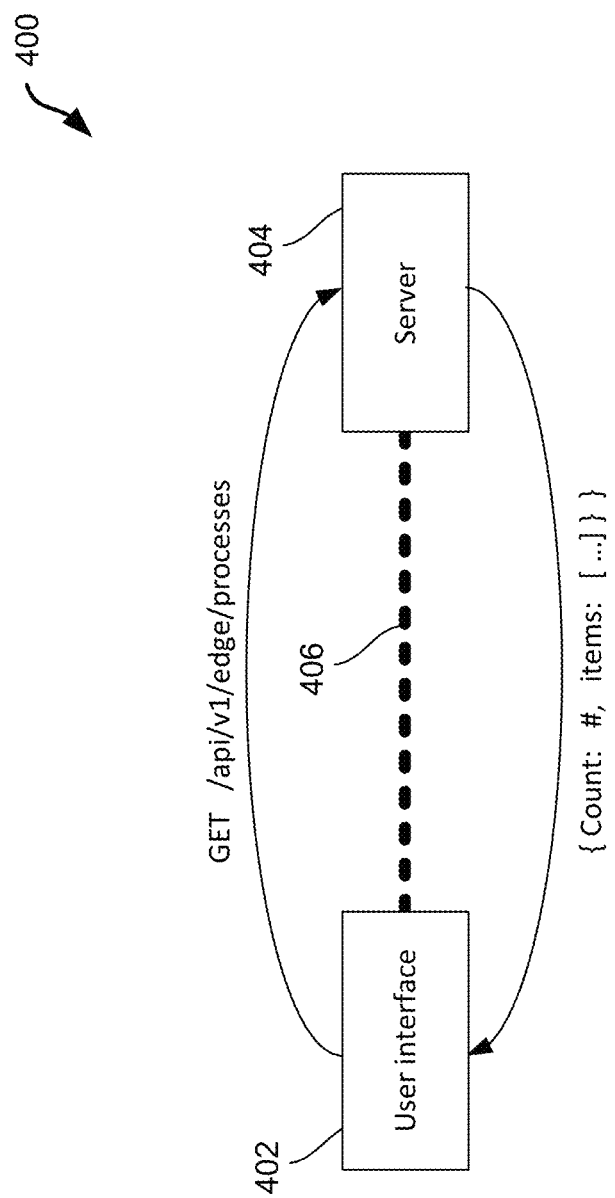
FIG. 4A is a schematic diagram showing aspects of an example computer node of an observability pipeline system.

FIG. 4A is a schematic diagram showing aspects of an example computer system 400 of an observability pipeline system. The example computer system 400 includes a user interface 402 and a server 404 communicably coupled through a socket 406, e.g., an HTTP socket.

Figure 4B:
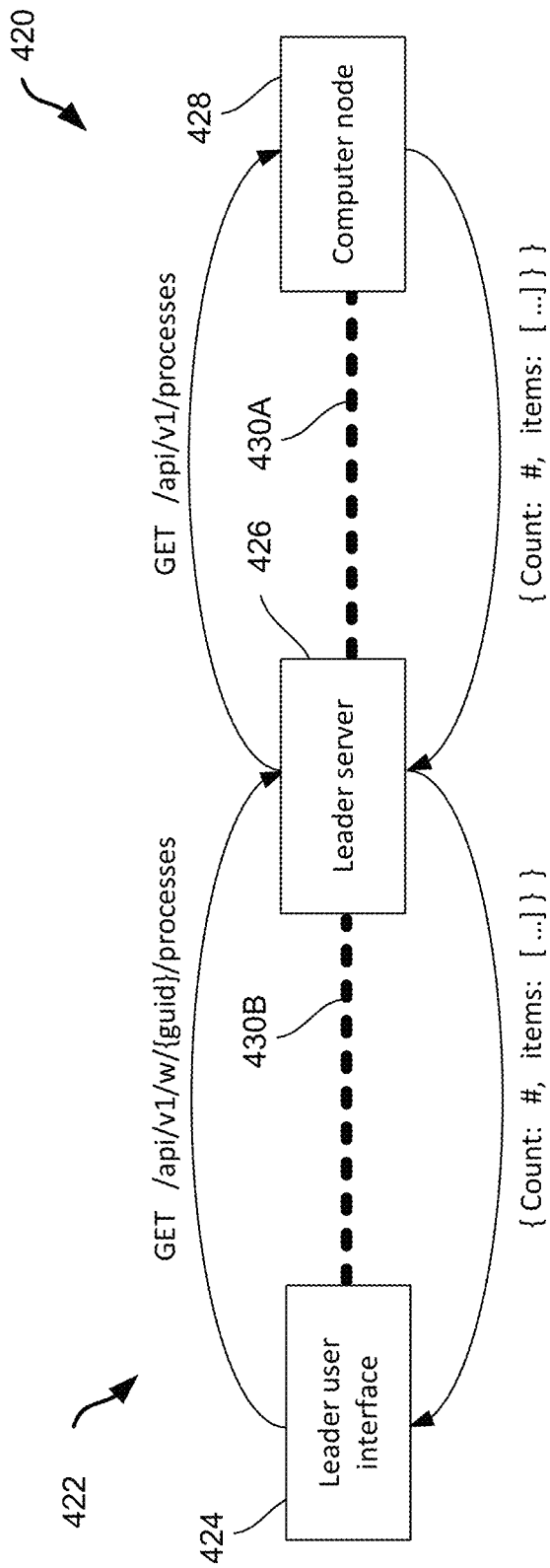
FIG. 4B is a schematic diagram showing aspects of an example observability pipeline system.

FIG. 4B is a schematic diagram showing aspects of another example observability pipeline system 420. The example observability pipeline system 420 includes a leader role 422 and a computer node 428 communicably coupled to the leader role 422 through a first socket 430A, e.g., a remote procedure call (RPC) socket. As shown in FIG. 4B, the leader role 422 includes a leader user interface 424 and a leader server 426 communicably coupled to the leader UI 424 through a second socket 430B, e.g., a HTTP socket.

In some instances, an edge agent on the computer node 428 may include a local user interface (UI) which is configured to provide various tools for exploring the computer node. For example, the UI of an edge agent can present system health data (e.g., uptime, load, resource usage, etc.), processes, files, and configurations on the computer node 428. The UI of an edge agent allows editing the local configuration for the edge agent on the computer node 428.

The user interface program on the computer node 428 includes a package through which a user of the computer node 428 can connect to other parts of the observability pipeline system 420, for example, the leader role 422 or another computer node with an edge agent (e.g., an edge node). When the user interface program is started, the user interface program is connected to the API socket on the computer node 428 to decide which views to display. The views then access the API socket of the computer node 428 to populate views as the user navigates around.

In some implementations, the leader user interface 424 displays the same view but the leader user interface 424 is not able to use that same API on the leader role 422 to get the process list for the computer node 428. Instead, because the leader user interface 424 receives the URI to access the view, the leader user interface 424 knows that it should load the data for the computer node 428 with that GUID instead so it loads a different API on the leader role 422.

Through the connection enabled by the first socket 430A, the computer node 428 can relay status and health data to the leader server 426; and the leader server 426 can push configurations to the computer node 428. Through the connection enabled by the first socket 430A, the leader server 426 can send requests for the API to the computer node 428 and get back a response from the computer node. For instance, the leader user interface 424 of the leader role 422 may transmit a request to the leader server 426 through the second socket 430B. After receiving the request, the leader server 426 rewrites the received URL and then relays (e.g., proxies) the request through the first socket 430A to the computer node 428; obtain the response from the computer node 428; and forward the response to the leader user interface 424 via the second socket 430B.

In some implementations, the computer node 428 initiates the connection on the first socket 430A to the leader server 426 of the observability pipeline system 420, which can simplify network configuration on the computer node 428. In some implementations, the API on the computer node 428 is relayed to the leader user interface 424 through the leader server 426; and the user interface (e.g., the user interface 402 in FIG. 4A) views on the computer node 428 are not relayed to the leader user interface 424 through the leader server 426. For example, the list of the identified files on the computer node 428 can be displayed on the leader user interface 424. In some implementations, the methods and techniques presented here allow the access to local interfaces of a computer node from a leader server based on a distributed deployment.

Figure 5:
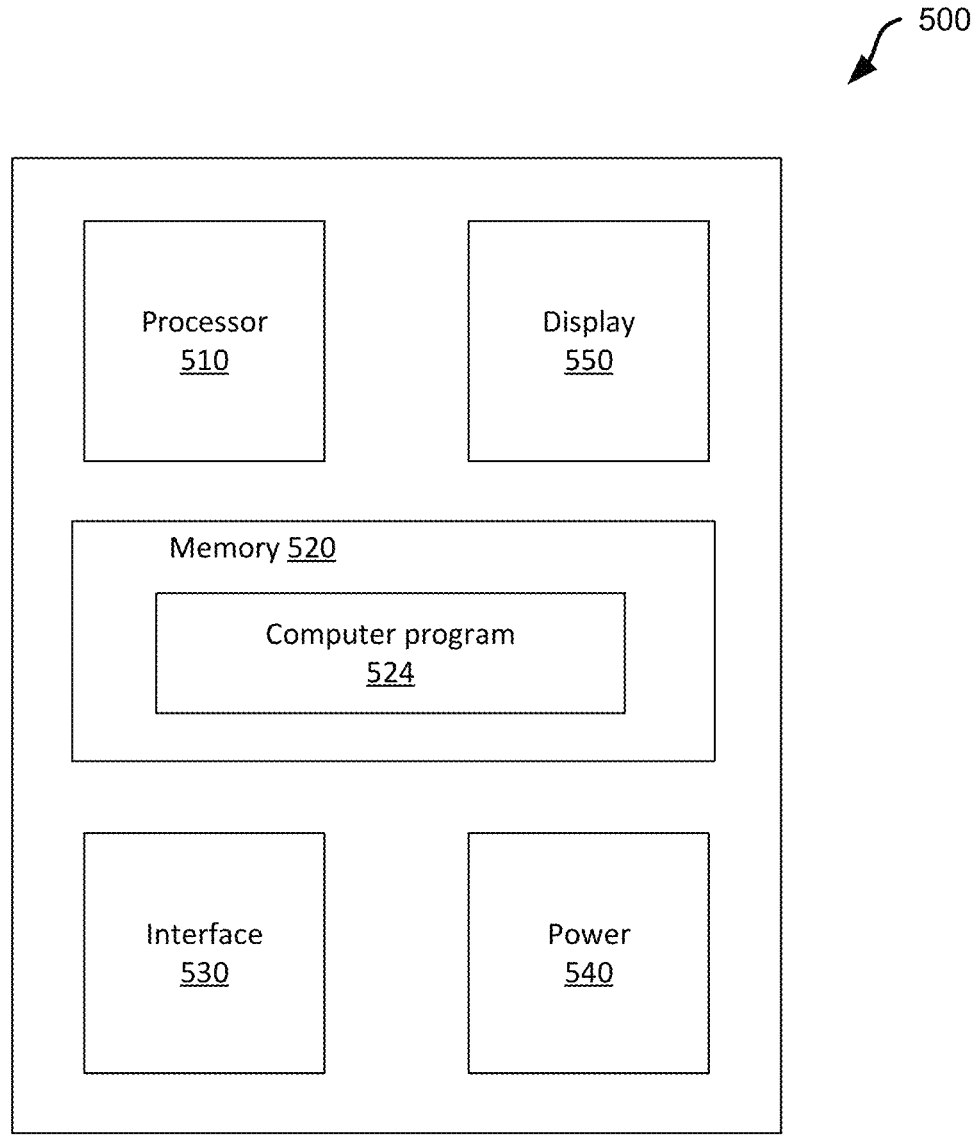
FIG. 5 is a block diagram showing an example computer system.

FIG. 5 is a block diagram showing an example of a computer system 500 that includes a data processing apparatus and one or more computer-readable storage devices. The term "data-processing apparatus" encompasses all kinds of apparatus, devices, nodes, and machines for processing data, including by way of example, a programmable processor, a computer, a system on a chip, or multiple ones, or combinations, of the foregoing, e.g., processor 510. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code), e.g., computer program 524, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors, e.g., processor 510, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any digital computer. Generally, a processor will receive instructions and data from a read-only memory or a random-access memory or both, e.g., memory 520. Elements of a computer can include a processor that performs actions in accordance with instructions, and one or more memory devices that store the instructions and data. A computer may also include or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media, and memory devices, including by way of example, semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

The example power unit 540 provides power to the other components of the computer system 500. For example, the other components may operate based on electrical power provided by the power unit 540 through a voltage bus or other connection. In some implementations, the power unit 540 includes a battery or a battery system, for example, a rechargeable battery. In some implementations, the power unit 540 includes an adapter (e.g., an AC adapter) that receives an external power signal (from an external source) and converts the external power signal to an internal power signal conditioned for a component of the computer system 500. The power unit 540 may include other components or operate in another manner.

To provide for interaction with a user, operations can be implemented on a computer having a display device, e.g., display 550, (e.g., a monitor, a touchscreen, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to, and receiving documents from, a device that is used by the user; for example, by sending web pages to a web browser on a user's client device in response to requests received from the web browser.

The computer system 500 may include a single computing device, or multiple computers that operate in proximity or generally remote from each other and typically interact through a communication network, e.g., via interface 530. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship between client and server may arise by virtue of computer programs running on the respective computers and having a client-server relationship to each other.

The example interface 530 may provide communication with other systems or devices. In some cases, the interface 530 includes a wireless communication interface that provides wireless communication under various wireless protocols, such as, for example, Bluetooth, Wi-Fi, Near Field Communication (NFC), GSM voice calls, SMS, EMS, or MMS messaging, wireless standards (e.g., CDMA, TDMA, PDC, WCDMA, CDMA2000, GPRS) among others. Such communication may occur, for example, through a radio-frequency transceiver or another type of component. In some cases, the interface 530 includes a wired communication interface (e.g., USB, Ethernet) that can be connected to one or more input/output devices, such as, for example, a keyboard, a pointing device, a scanner, or a networking device such as a switch or router, for example, through a network adapter.

In a general aspect, an edge-based data collection system discovers data in an observability pipeline system.

In a first example, a method is performed by an edge agent of an observability pipeline system running on a computer node. The method includes identifying processes running on the computer node; identifying files on the computer node that the processes have opened for writing; accessing log discovery parameters of the observability pipeline system; selecting a plurality of files from the identified files according to the log discovery parameters; generating a list of discovered log files, the list of discovered log files comprising a path and a name for each of the plurality of files; adding the list of discovered log files to a list of monitored log files to be monitored by the observability pipeline system; and after adding the list of discovered log files to the list of monitored log files, monitoring the plurality of files to generate input for the observability pipeline system.

Implementations of the first example may include one or more of the following features. The method further includes extracting data from the list of discovered log files; generating observability pipeline input data by formatting the extracted data; and processing the observability pipeline input data by operation of a data processing engine on the computer node. Processing the observability pipeline input data generates observability pipeline output data. The method includes collecting metadata from the computer node; augmenting the observability pipeline output data to include the metadata; and sending the augmented observability pipeline output data to a data destination. The log discovery parameters comprise a file type parameter, a file path parameter, or a file name parameter. The edge agent runs in a container on the computer node, and identifying processes running on the computer node includes mounting a root file system of the computer node; and scanning the root file system to identify processes running in other containers.

Implementations of the first example may include one or more of the following features. Identifying the files on the computer node comprises identifying a first file, and the method includes identifying a container on the computer node where the first file is defined; and identifying a modified path for the first file, wherein the modified path allows a process running outside the container to access the first file. The method includes running a container discovery process to identify containers running on the computer node; detecting console log files in each of the containers; and adding a list of the console log files to the list of monitored log files.

Implementations of the first example may include one or more of the following features. The method includes running a container discovery process to identify containers running on the computer node; detecting console logs in each of the containers; and collecting the console logs through one or more sockets. The method further includes collecting container metrics for each of the containers; generating observability pipeline input data by formatting the container metrics; and processing the observability pipeline input data by operation of a data processing engine on the computer node.

Implementations of the first example may include one or more of the following features. The method includes modifying the list of discovered log files based on input received through a user interface in response to the list of discovered log files being presented to a user. Adding the list of discovered log files to the list of monitored log files includes adding the modified list of discovered log files to the list of monitored log files. The plurality of files is a first plurality of files. The list of discovered log files is a first list of discovered log files. The method includes modifying the log discovery parameters based on user input; selecting a second plurality of files from the identified files according to the modified log discovery parameters; generating a second list of discovered log files, the second list of discovered log files comprising a path and a name for each of the second plurality of files; and adding the second list of discovered log files to the list of monitored log files to be monitored by the observability pipeline system. The observability pipeline system includes a leader role communicably coupled to the computer node through a network. The method includes displaying a list of the identified files on a user interface of the leader role.

In a second example, a computer system includes one or more computer processors that perform one or more operations of the first example.

In a third example, a non-transitory computer-readable medium comprises instructions that are operable when executed by data processing apparatus to perform one or more operations of the first example.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method performed by an edge agent of an observability pipeline system, the edge agent running on a computer node, the method comprising:
   identifying processes running on the computer node;
   identifying files on the computer node that the processes have opened for writing;
   accessing log discovery parameters of the observability pipeline system;
   selecting a plurality of files from the identified files according to the log discovery parameters;
   generating a list of discovered log files, the list of discovered log files comprising a path and a name for each of the plurality of files;
   adding the list of discovered log files to a list of monitored log files to be monitored by the observability pipeline system; and
   after adding the list of discovered log files to the list of monitored log files, monitoring the plurality of files to generate input for the observability pipeline system.

2. The method of claim 1, wherein monitoring the plurality of files to generate input for the observability pipeline system comprises:
   extracting data from the one or more of the plurality of files;
   generating observability pipeline input data by formatting the extracted data; and
   processing the observability pipeline input data by operation of a data processing engine on the computer node.

3. The method of claim 2, wherein processing the observability pipeline input data generates observability pipeline output data, and the method comprises:
   collecting metadata from the computer node;
   augmenting the observability pipeline output data to include the metadata; and
   sending the augmented observability pipeline output data to a data destination.

4. The method of claim 1, wherein the log discovery parameters comprise a file type parameter, a file path parameter, or a file name parameter.

5. The method of claim 1, wherein the edge agent runs in a container on the computer node, and identifying processes running on the computer node comprises:
mounting a root file system of the computer node; and
scanning the root file system to identify processes running in other containers.

6. The method of claim 1, wherein identifying files on the computer node comprises identifying a first file, and the method comprises:
identifying a container on the computer node where the first file is defined; and
identifying a modified path for the first file, wherein the modified path allows a process running outside the container to access the first file.

7. The method of claim 1, comprising:
running a container discovery process to identify containers running on the computer node;
detecting console log files in each of the containers; and
adding a list of the console log files to the list of monitored log files.

8. The method of claim 1, comprising:
running a container discovery process to identify containers running on the computer node;
detecting console logs in each of the containers; and
collecting the console logs through one or more sockets.

9. The method of claim 8, comprising:
collecting container metrics for each of the containers;
generating observability pipeline input data by formatting the container metrics; and
processing the observability pipeline input data by operation of a data processing engine on the computer node.

10. The method of claim 1, comprising modifying the list of discovered log files based on input received through a user interface in response to the list of discovered log files being presented to a user, wherein adding the list of discovered log files to the list of monitored log files comprises adding the modified list of discovered log files to the list of monitored log files.

11. The method of claim 1, wherein the plurality of files is a first plurality of files, the list of discovered log files is a first list of discovered log files, and the method comprises:
modifying the log discovery parameters based on user input;
selecting a second plurality of files from the identified files according to the modified log discovery parameters;
generating a second list of discovered log files, the second list of discovered log files comprising a path and a name for each of the second plurality of files; and
adding the second list of discovered log files to the list of monitored log files to be monitored by the observability pipeline system.

12. The method of claim 1, wherein the observability pipeline system comprises a leader role operating on a second computer node that communicates with the computer node over a network, and the method comprises displaying a list of the identified files on a user interface of the second computer node.

13. A computer node comprising:
one or more processors; and
memory storing instructions that, when executed by the one or more processors, cause the one or more processors to perform operations of an edge agent of an observability pipeline system, the operations comprising:
identifying processes running on the computer node;
identifying files on the computer node that the processes have opened for writing;
accessing log discovery parameters of the observability pipeline system;
selecting a plurality of files from the identified files according to the log discovery parameters;
generating a list of discovered log files, the list of discovered log files comprising a path and a name for each of the plurality of files;
adding the list of discovered log files to a list of monitored log files to be monitored by the observability pipeline system; and
after adding the list of discovered log files to the list of monitored log files, monitoring the plurality of files to generate input for the observability pipeline system.

14. The computer node of claim 13, wherein monitoring the plurality of files to generate input for the observability pipeline system comprises:
extracting data from one or more of the plurality of files;
generating observability pipeline input data by formatting the extracted data; and
processing the observability pipeline input data by operation of a data processing engine on the computer node.

15. The computer node of claim 14, wherein processing the observability pipeline input data generates observability pipeline output data, and the operations comprise:
collecting metadata from the computer node;
augmenting the observability pipeline output data to include the metadata; and
sending the augmented observability pipeline output data to a data destination.

16. The computer node of claim 13, wherein the log discovery parameters comprise a file type parameter, a file path parameter, or a file name parameter.

17. The computer node of claim 13, wherein the edge agent runs in a container on the computer node, and identifying processes running on the computer node comprises:
mounting a root file system of the computer node; and
scanning the root file system to identify processes running in other containers.

18. The computer node of claim 13, wherein identifying files on the computer node comprises identifying a first file, and the operations comprise:
identifying a container on the computer node where the first file is defined; and
identifying a modified path for the first file, wherein the modified path allows a process running outside the container to access the first file.

19. The computer node of claim 13, wherein the operations comprise:
running a container discovery process to identify containers running on the computer node;
detecting console log files in each of the containers; and
adding a list of the console log files to the list of monitored log files.

20. The computer node of claim 13, wherein the operations comprise:
running a container discovery process to identify containers running on the computer node;
detecting console logs in each of the containers; and
collecting the console logs through one or more sockets.

21. The computer node of claim 20, wherein the operations comprise:
collecting container metrics for each of the containers;
generating observability pipeline input data by formatting the container metrics; and processing the observability pipeline input data by operation of a data processing engine on the computer node.

22. The computer node of claim 13, wherein the operations comprise:
modifying the list of discovered log files based on input received through a user interface in response to the list of discovered log files being presented to a user, wherein adding the list of discovered log files to the list of monitored log files comprises adding the modified list of discovered log files to the list of monitored log files.

23. The computer node of claim 13, wherein the plurality of files is a first plurality of files, the list of discovered log files is a first list of discovered log files, and the operations comprise:
modifying the log discovery parameters based on user input;
selecting a second plurality of files from the identified files according to the modified log discovery parameters;
generating a second list of discovered log files, the second list of discovered log files comprising a path and a name for each of the second plurality of files; and
adding the second list of discovered log files to the list of monitored log files to be monitored by the observability pipeline system.

24. A non-transitory computer-readable medium storing instructions that perform operations of an edge agent of an observability pipeline system when executed by data processing apparatus of a computer node, the operations comprising:
identifying processes running on the computer node;
identifying files on the computer node that the processes have opened for writing;
accessing log discovery parameters of the observability pipeline system;
selecting a plurality of files from the identified files according to the log discovery parameters;
generating a list of discovered log files, the list of discovered log files comprising a path and a name for each of the plurality of files;
adding the list of discovered log files to a list of monitored log files to be monitored by the observability pipeline system; and
after adding the list of discovered log files to the list of monitored log files, monitoring the plurality of files to generate input for the observability pipeline system.

* * * * *

UNITED STATES PATENT AND TRADEMARK OFFICE
CERTIFICATE OF CORRECTION

| | | |
|---|---|---|
| PATENT NO. | : 11,921,602 B2 | Page 1 of 1 |
| APPLICATION NO. | : 18/167434 | |
| DATED | : March 5, 2024 | |
| INVENTOR(S) | : Dugas et al. | |

It is certified that error appears in the above-identified patent and that said Letters Patent is hereby corrected as shown below:

In the Specification

Column 3, Detailed Description, Line 57 Delete "(IOT)" and insert -- (IoT) -- therefor Column 7, Detailed Description, Line 9 After "observability" insert -- pipeline -- therefor Column 14, Detailed Description, Line 62 Delete "fa-" and insert -- fA- -- therefor Column 19, Detailed Description, Line 28 Delete "oily" and insert -- o1 1y -- therefor Signed and Sealed this
Fourth Day of June, 2024

*Katherine Kelly Vidal*

Katherine Kelly Vidal
*Director of the United States Patent and Trademark Office*